US006903719B2

United States Patent
Richley

(10) Patent No.: US 6,903,719 B2
(45) Date of Patent: Jun. 7, 2005

(54) ROTATION AND THRESHOLD MECHANISM FOR TWISTING BALL DISPLAY

(75) Inventor: Edward A. Richley, Gaithersburg, MD (US)

(73) Assignee: Xerox Corporation, Stamford, CT (US)

(*) Notice: Subject to any disclaimer, the term of this patent is extended or adjusted under 35 U.S.C. 154(b) by 438 days.

(21) Appl. No.: 09/770,430

(22) Filed: Jan. 26, 2001

(65) Prior Publication Data

US 2002/0135558 A1 Sep. 26, 2002

(51) Int. Cl.$^7$ ................................................. G09G 3/34
(52) U.S. Cl. ............................................ 345/107; 345/84
(58) Field of Search ........................... 345/107, 84, 85, 345/86

(56) References Cited

U.S. PATENT DOCUMENTS

| | | | | |
|---|---|---|---|---|
| 4,126,854 A | * | 11/1978 | Sheridon | 340/373 |
| 4,143,103 A | * | 3/1979 | Sheridon | 264/4 |
| 5,262,098 A | * | 11/1993 | Crowley et al. | 264/8 |
| 5,900,192 A | * | 5/1999 | Richley | 264/8 |
| 6,222,513 B1 | * | 4/2001 | Howard et al. | 345/84 |
| 6,383,619 B1 | * | 5/2002 | Engler et al. | 428/212 |
| 6,428,868 B1 | * | 8/2002 | Sheridon et al. | 428/40.2 |
| 6,441,946 B1 | * | 8/2002 | Sheridon | 359/296 |

* cited by examiner

Primary Examiner—Regina Liang
Assistant Examiner—Jennifer T. Nguyen
(74) Attorney, Agent, or Firm—Perman & Green, LLP

(57) ABSTRACT

A rotation mechanism for bichromal balls in a twisting ball display is based on electrostatic induction. A bichromal ball with hemispherically differentiated electrical time constants is immersed in a dielectric liquid containing a charge director solution. The liquid is contained within an encapsulant. The charge director solution has positive and negative ions with substantially different mobilities. Space charge clouds created in this fluid upon application of an electric field act so as to induce polarization differently in each hemisphere, leading to a net dynamic polarization. Interaction between the space charge and the induced polarization serves to rotate the ball. Ions are subsequently trapped at the fluid/encapsulant interface due to greater polarizability of the encapsulant. A threshold is obtained by the excess field needed to release the ions and so reverse the ion motion.

3 Claims, 3 Drawing Sheets

ROTATION AND THRESHOLD MECHANISM FOR TWISTING BALL DISPLAY

BACKGROUND OF THE INVENTION

1. Field of the Invention

Twisting ball flat panel displays or gyricon "electric paper" using bichromal balls are well known as disclosed in U.S. patents to Sheridon (U.S. Pat. Nos. 4,126,854, and 4,143,103). In systems according to these patents bichromal balls, in a matrix between electrodes, acquire a static electric charge with a dipole component by chemical interaction with a charge director solution and can be oriented by application of a voltage to form visible elements of images.

Other mechanisms have been proposed along similar lines while avoiding the need for a charge director. For example, a difference in contact potential between two semiconducting hemispheres has been proposed (see Richley D96005). Still other proposals have been made for using electric materials to form a permanent dipole (no IP yet).

Extensive experimentation has shown poor performance from chemical means, and a lack of methodology in their design. Furthermore, there appears to be a dearth of possible material combinations which will produce the desired results and also be compatible with current manufacturing techniques.

Methods based on permanent polarization have a fundamental problem of conflicting requirements. In order to remove any tribocharge, and to provide some lubrication, the bichromal balls must be immersed in a fluid. Removal of tribocharge is accomplished through neutralization by any residual ionic components of this fluid. These ionic components are inevitable, even if due only to impurities, and their neutralization effects are cumulative. The conflicting requirement results from the fact that these neutralizing ions will also serve to neutralize any permanent polarization which could be incorporated into a ball. Thus, over some amount of time, any ball containing a permanent dipole will acquire ions from the dielectric fluid which will be bound to it and diminish its net dipole.

A threshold mechanism is needed for passive addressing of a display. Some means for obtaining response with some applied voltage, and no response at half that voltage is necessary in order that simple row-and-column addressing may be used to randomly address the display. Experimentally, there appears to be no well-defined threshold mechanism in existing twisting ball displays. Furthermore, the pursuit of a dipole by chemical means does not provide any indication of how one might be obtained.

SUMMARY OF THE INVENTION

The present invention overcomes these difficulties by utilizing a dynamic mechanism for dipole creation. A low concentration of charge director is dissolved in the dielectric liquid. This charge director subsequently ionizes to some small degree, forming a weakly ionized solution. When an electric field is applied, the mobile ions of opposite sign move toward opposite walls of the cavity, where-upon they form into relatively small clouds of relatively highly concentrated space charge. These clouds, or packets, of charge persist as long as this pre-charge field is applied. Upon reversal of the field polarity, and with sufficient field magnitude, the packets traverse the cavity in directions opposite to that of the previous pre-charge.

One ion packet is made of positive ions, and the other is made of negative ions. In general, the ions of different polarity will have different mobilities, due to differences in their chemical structure. In practice, positive ions are not all of the same type, nor are negative ions. However, the distribution of mobilities among ions of like sign will differ from the distribution of ions of the opposite sign. Thus, some large fraction of positive ions will have a different mobility than some large fraction of negative ions. It is this net mobility difference which is utilized by this invention.

Upon reversal of the applied field, after the pre-charge cycle, the ions with higher mobility will traverse the cavity more quickly than the ions of lower mobility. These slower ions are then left as the only moving ions in the cavity. Due to the high concentration of the ion packet, it causes a significant perturbation in the electric field in its vicinity. The field is higher both in front of and to the side of this packet, than in its absence. This presents a rotating field component to a portion of the cavity.

One side of the ball is fabricated from a material with higher electrical conductivity and/or dielectric constant than the other. This side is thus more polarizable by induction than the other. As a result, this hemisphere will respond to the passing space charge packet of the slower ions. An image charge will begin to form as the packet passes, causing the highly polarizable side to follow the ion packet across the cavity. The ball thus rotates so that the highly polarizable side follows the slower ions.

Upon completion of the traversal, each ion packet is again maintained as a packet, but at the wall opposite that of the pre-charge. The cavity wall is formed by an encapsulating material with a slightly higher dielectric constant than that of the dielectric liquid. The ions in each packet are thus attracted to the cavity wall by their induced images therein. Proper choice of dielectric constant difference and chemical species of ions can control the magnitude of this attraction so that a known predetermined applied field is needed in order to reverse the ion motion for the next cycle. Thus, the metastable state of ion attraction can be controlled so as to provide a useful threshold of the applied writing voltage.

The present twisting ball flat panel displays are assembled in the manner disclosed in the prior art, such as U.S. Pat. No. 4,126,854, the disclosure of which has been incorporated herein. Thus the present twisting ball display panel is sandwiched between optically-transparent substrates and electrodes to permit the image display formed in the panel, by application of selective voltage patterns, to be viewed due to incident light striking the display.

BRIEF DESCRIPTION OF THE DRAWINGS

The foregoing aspects and other features of the present invention are explained in the following description, taken in connection with the accompanying drawings, wherein.

DETAILED DESCRIPTION

Figure 1:
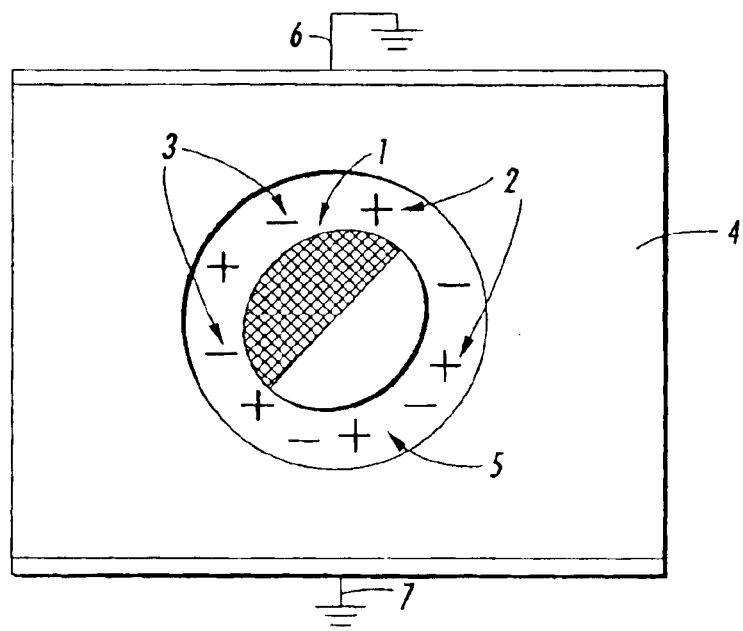
FIG. 1 shows a bichromal ball 1, a cavity 5, an encapsulant 4, electrodes 6 and 7, positive ions 2 and negative ions 3 in a quiescent state before the application of any voltage.

FIG. 1 shows a bichromal ball, fabricated from some solid material, such as by means described in Crowley et al. U.S.

Pat. No. 5,262,098, the disclosure of which is hereby incorporated herein by reference thereto. The ball is predominately made of synthetic wax (Polywax 1000) with differences among the hemispheres. The white hemisphere contains a titania-based pigment (duPont R900), while the black side contains a conductive black metal-oxide pigment (Ferro 6331) as well as a chemical additive (5126). The concentrations of materials are chosen so that the white side exhibits immeasurably low electrical conductivity, while the black side has a conductivity of approximately 2 GΩ-M. The net dielectric constant of each side is similar, each being approximately 40 pF/M. The electrical time constant of the black side (product of resistivity and dielectric constant) is thus approximately 1 sec.

Figure 2:
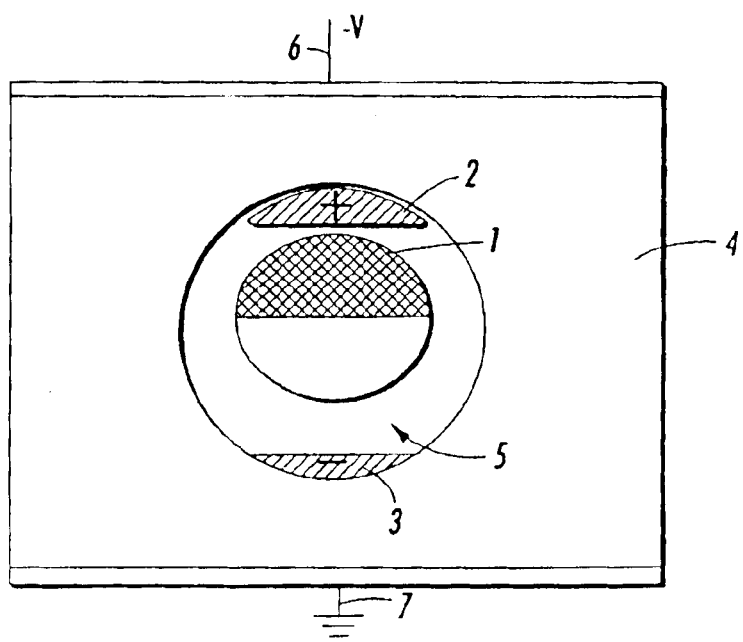
FIG. 2 shows the same materials during the application of a pre-charge.

Cavity 5, within encapsulant 4, contains a dielectric liquid, such as Isopar V. Dissolved within this liquid is a charge director such as QUAT ???? in sufficiently low concentration that all resident mobile ions can be separated against the walls of cavity 5 under the influence of a modest voltage (100 V) applied to electrode 6. FIG. 2 shows the situation when such a voltage has been applied. Positive ions 2 and negative ions 3 have separated and drifted toward the cavity walls nearest to the sign opposite their own. There they are held in tight packets by the applied field.

Figure 3:
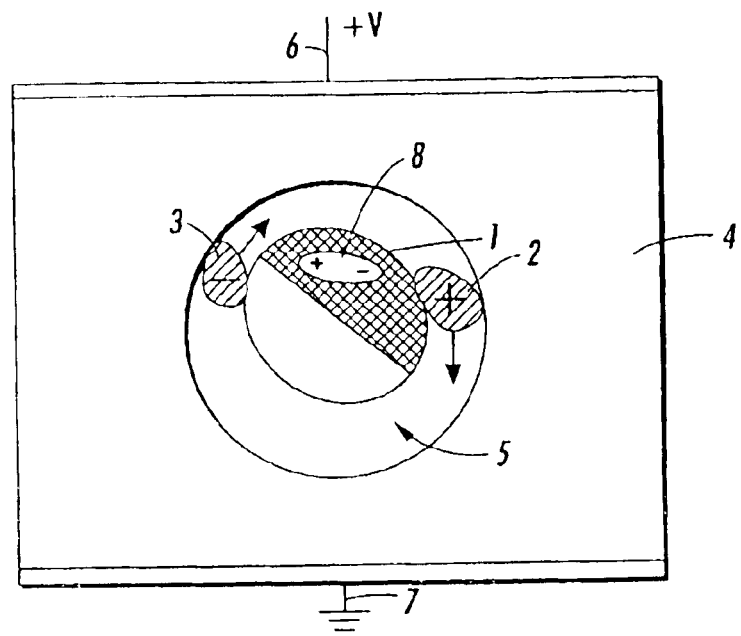
FIG. 3 shows the same materials during a write cycle, with induced dipole 8.

When, as in FIG. 3, a reverse voltage is applied to electrode 5, the ions begin to drift. The ions with higher mobility, shown as the negative ions, move more quickly than the ions of lower mobility, shown as the positive ions. Thus, a time exists when the cavity contains a net mobile space charge which is moving toward a cavity wall. As they move, these slower ions perturb the electric field in their vicinity. The field behind the cloud is necessarily reduced from the applied field, while that ahead is enhanced. Furthermore, there is also a lateral field. This lateral field induces an image charge in the black side of bichromal ball 1. Due to the speed of the positive ions and the electrical time constant of the black hemisphere, a temporal and, hence, spatial lag exists between the space charge cloud and the induced charge. This lagging image is shown as a dipole 8.

Each of the present rotating balls or particles has an anisotropy for providing an electrical dipole moment which renders the black side of the ball or particle electrically responsive, causing the ball or particle to rotate to an orientation in which the dipole moment aligns with the electric field. In the present invention, the dipole moment is that of the balls or particles plus the surrounding ions.

The interaction of dipole 8 with space charge cloud 2 is one of attraction. Just as with an electrostatic induction motor, the rotating field component is able to influence the black side into following along, in the motion of space charge cloud 2. The rotational component of the attractive force is dynamic. That is, it depends on the motion of the space charge cloud for its existence. If the ions were to stop, the lagging dipole would catch up, and no rotational torque would ensue.

Figure 4:
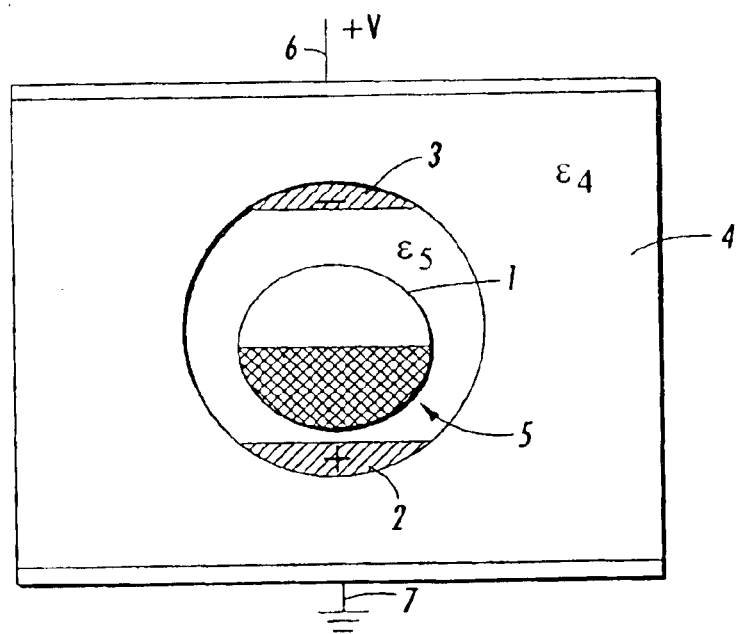
FIG. 4 shows the subsequent state after the write cycle.

Upon reaching the opposite cavity wall, as shown in FIG. 4, the space charge cloud 2 is arrested. Further motion of the space charge cloud is not possible, and the rotation very nearly ceases. The black side has substantially been rotated to the side where the positive space charge has gone.

Referring again to FIG. 3, it will be recalled that the electric field between the positive ion cloud 2 and the lower electrode 7 is higher than anywhere else in the cavity 5 and that it is getting larger as the motion progresses. Likewise, the field above it is lower.

Thus, a non-uniform field exists in the cavity which can lead to a further mechanism for rotation. Provided that the dielectric constant of the black side of ball 1 is higher than both the white side and the dielectric liquid in cavity 5, or that there exists some finite conductivity in the black side which is not present in the white or fluid, a dielectrophoretic force will exist. This force is a static force, and is due to the asymmetry of the ball. Any non-uniform electric field will induce image charges on an asymmetric object in such a manner as to pull the higher permitivity material toward the increasing field. This well-known mechanism can serve to complete the rotation of the ball as shown in FIG. 4. Near the end of its travel, the ion space charge cloud slows down, diminishing the effects of the dynamic polarization forces. At this point, the heretofore weaker static dielectrophoretic forces can take over and complete the rotation.

Finally, in FIG. 4, the encapsulating material 4 is chosen to have a higher permitivity ($\epsilon_4$) than the dielectric fluid 5 ($\epsilon_5$). At the end of their motion, ion clouds 2 and 3 will feel an image force from included charge in encapsulant 4 as well as from charges induced in corresponding electrodes. This force creates a potential well in which these ions will sit metastably.

Any subsequent applied voltage to electrode 6 must be of such a magnitude or treshhold as to overcome this image based force in order to release the ions for a write cycle. This is a convenient situation as it creates a voltage threshold for applied voltages, below which ions can not move and balls can not be turned.

Figure 5:
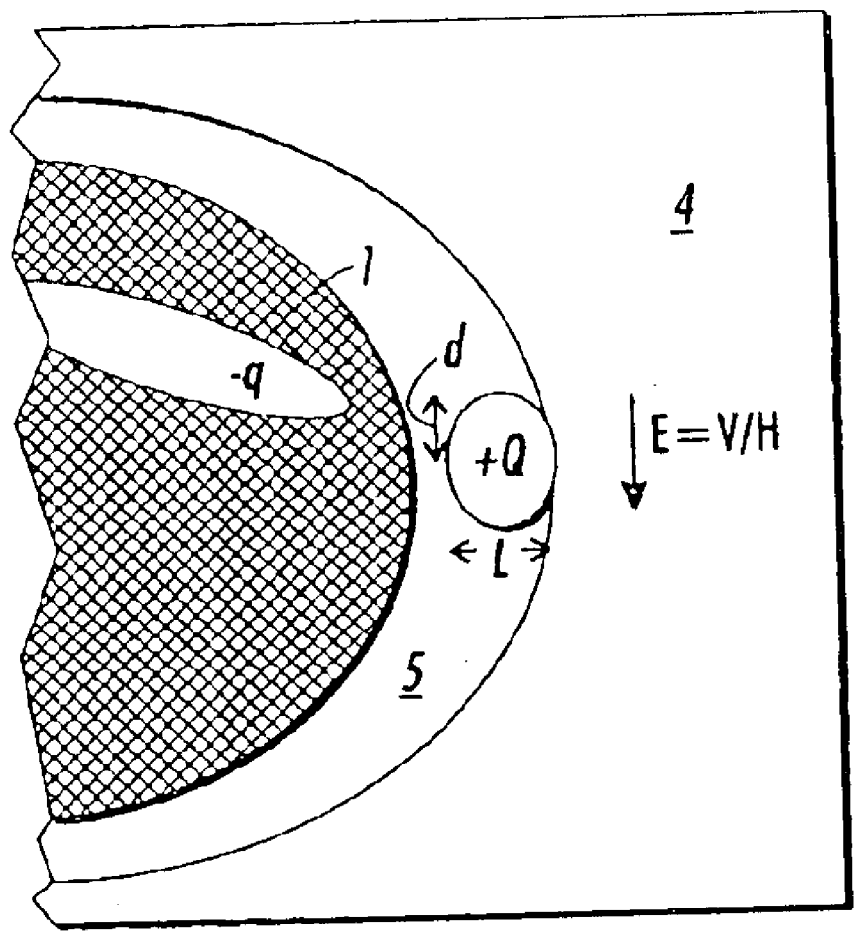
FIG. 5 shows an enlarged view of the surface of the conductive hemisphere of ball 1, with space charge cloud 2 of characteristic dimension L.

It is possible to be somewhat quantitative about these effects. Referring to FIG. 5 it will be seen that space charge cloud of magnitude +Q2 with typical dimension L (probably the distance between the ball surface and cavity wall) is moving in the applied field of magnitude E. The induced dipole charge of magnitude −q within the black hemisphere lags behind in its motion by a distance d.

Space charge cloud 2 moves with velocity:

$$v = \mu E \tag{1}$$

where $\mu$ is the mobility of the constituent ions and E is the applied field. In practice, this velocity will be modified by the motion of the dielectric fluid, but for purposes of estimation, it will be approximately as shown above.

Simple electrostatics argues that:

$$q = Q(1 - e^{31\,\Delta t/r}) \tag{2}$$

where r is the electrical time constant of the material of the conducting hemisphere, while $\Delta t$ is some characteristic time over which any part of the black hemisphere falls under the influence of space charge cloud 2. This characteristic time is roughly the dimension of the cloud divided by the cloud velocity. Thus:

$$q = Q(1 - e^{-L/(\mu E r)}) \tag{3}$$

Meanwhile, the position of the induced charge lags behind the space charge cloud by a distance d, which is roughly equal to the cloud velocity times the material time constant. Thus, $d = \mu E r$. The lag causes the attractive force between 2 and its induced charge to have a component along the surface of the ball. The force of attraction between two charges along their line of centers is:

$$F_c = \frac{Qq}{4\pi\epsilon r^2} \quad (4)$$

where r is the separation distance and is roughly L in this case. The component of force along the surface is this central force times the sine of the angle to the normal, or:

$$F_l = \frac{Qq}{4\pi\epsilon L^2}\frac{d}{L} \quad (5)$$

and the torque will be this force time the moment arm (D/2 where D is the ball diameter). The torque is then:

$$T = \frac{Q^2}{4\pi\epsilon}\frac{D}{2L^3}\mu Er(1 - e^{-L/(\mu Er)}) \quad (6)$$

This torque must overcome the viscous drag of the liquid, which is proportional to rotational velocity, ω, according to:

$$T = \omega 8\pi\eta\frac{a^3 b^3}{b^3 - a^3} \approx \omega 8\pi\eta\frac{D^4}{48L} \quad (7)$$

where b is the cavity radius and a is the ball radius and the approximation is for small difference b−a.

Equating these expressions, and integrating over time to get a rotation angle, θ:

$$\theta = \frac{48L}{D^4}\frac{1}{8\pi\eta}\frac{Q^2}{4\pi\epsilon}\frac{D}{2L^3}\mu Er(1 - e^{-L/(\mu Er)})\frac{D}{\mu E} \quad (8)$$

where the time interval is roughly $$\frac{D}{\mu E},$$

or the transit time of ions for a ball diameter. This simplifies to:

$$\theta = \frac{48}{32\pi}\frac{Q^2}{D^2 L^2}\frac{r}{\eta\epsilon}(1 - e^{-L/(\mu Er)}) \quad (9)$$

As long as θ is sufficiently large, rotation will occur. Ion mobility affects the lag angle as well as the rotation time, but in opposite ways. Thus, the rotation angle is only affected by mobility through the magnitude of induced charge. In order to make the induced charge large, one should ensure:

$$r \leq \frac{L}{\mu E} \quad (10)$$

However, if made too large by too small a choice of r, the rotation will suffer from insufficient lag. Ideally:

$$r(q - e^{-L/(\mu Er)}) \quad (11)$$

is made as large as possible by proper choice of r. Thus, an optimum system will have:

$$r \approx \frac{L}{\mu E} \quad (12)$$

The effectiveness of this mechanism is based on the proximity of the space charge cloud to the ball surface and, hence, its image. On the other hand, the static forces resulting from asymmetry of the ball result from images at greater differences. The "electric pressure" acting on a hemisphere rotated by angle ø causes a torque roughly equal to:

$$T = \frac{Q^2}{16\pi\epsilon}\frac{\phi}{D} \quad (13)$$

which, for small θ, is much smaller than the dynamic, induced torque given above for any possible values of ø, due to the large ratio of D/L. However, near the end of its motion, the dynamic forces subside, and the static torque estimated above may be large enough to complete the ball rotation.

At the end of rotation, the space charge cloud will be tightly packed near a cavity wall. An ion of charge q0 and radius h sitting on a dielectric of constant $\epsilon_4$ but within a dielectric liquid of constant $\epsilon_5$ will experience a force of attraction to its image equivalent to a field of magnitude:

$$E_{att} = \frac{q0}{4\pi\epsilon_0}\frac{1}{4h^2}\frac{\epsilon_4 - \epsilon_5}{\epsilon_4 + \epsilon_5} \quad (14)$$

from which it can be seen that the binding field can be adjusted by choice of dielectric constant of the cavity material.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An addressable display device comprising:
    (a) a light-transparent support body containing a plurality of anisotropic particles contained within dielectric liquid-filled cavities having walls having a higher dielectric constant than that of said dielectric fluid;
    (b) a parallel pair of electrical conductors, one on each surface of said support body and at least one of which is light-transparent;
    (c) each of said anisotropic particles of the support body having dissimilar sections of contrasting optical appearance and electrical conductivity, one section having an anisotropy for inducing a dipole moment which renders said section electrically-responsive
    (d) said dielectric liquid having dissolved therein a low concentration of an ionizable charge director material which, under application of an electric field between said electrical conductors, forms clusters of mobile ions of opposite charge and different mobilities which move within said liquid towards the cavity wall adjacent the electrical conductor of opposite polarity, said mobile ions inducing said dipole moment and rotating said particles so that the one section thereof faces the electrical conductor of opposite polarity each time the polarity between said conductors is reversed.

2. An addressable display device according to claim 1 in which the particles require the application of an electric field of a predetermined magnitude or threshold to the electrodes to cause the particles to release from attraction to one electrode and to rotate and face the other electrode.

3. An addressable display device according to claim 1 in which said particles are bichromal balls and said sections are hemispheres.

* * * * *